(12) United States Patent
Koskinen et al.

(10) Patent No.: US 12,335,843 B2
(45) Date of Patent: Jun. 17, 2025

(54) METHOD OF PROVIDING ACCESS FOR REDUCED CAPABILITY DEVICES, USER EQUIPMENT, AND BASE STATION THEREOF

(71) Applicant: NOKIA TECHNOLOGIES OY, Espoo (FI)

(72) Inventors: Jussi-Pekka Koskinen, Oulu (FI); Jorma Johannes Kaikkonen, Oulu (FI); Samuli Heikki Turtinen, Li (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/545,043

(22) Filed: Dec. 19, 2023

(65) Prior Publication Data

US 2024/0121701 A1    Apr. 11, 2024

Related U.S. Application Data

(63) Continuation of application No. 17/313,100, filed on May 6, 2021, now Pat. No. 11,877,226.

(Continued)

(51) Int. Cl.
*H04W 48/02* (2009.01)
*H04W 8/24* (2009.01)
(Continued)

(52) U.S. Cl.
CPC ............. *H04W 48/02* (2013.01); *H04W 8/24* (2013.01); *H04W 12/06* (2013.01); *H04W 12/60* (2021.01); *H04W 48/16* (2013.01); *H04W 84/042* (2013.01)

(58) Field of Classification Search
CPC ....... H04W 48/02; H04W 8/24; H04W 12/06; H04W 12/60; H04W 48/16; H04W 84/042
See application file for complete search history.

(56) References Cited

U.S. PATENT DOCUMENTS

2010/0173633 A1    7/2010    Catovic et al.
2011/0122801 A1    5/2011    Franklin et al.
(Continued)

FOREIGN PATENT DOCUMENTS

EP    2 117 277 A1    11/2009
EP    2 595 339 A2    5/2013
(Continued)

OTHER PUBLICATIONS

"Evolved Universal Terrestrial Radio Access (E-UTRA); User Equipment (UE) procedures in idle mode," 3GPP TS 36.304, Sep. 2016.
(Continued)

*Primary Examiner* — Diane D Mizrahi
(74) *Attorney, Agent, or Firm* — ALSTON & BIRD LLP (57) ABSTRACT

The method at the user equipment (UE) includes first receiving authorization information, the authorization information including configuration data for reduced capability (REDCAP) devices in the communication network, second receiving system information from at least one first base station serving a first cell, the system information including information specific to a device category associated with the UE, determining access information for the first cell, based (Continued)

at least in part on the system information and the authorization information, and accessing the first cell, or identifying a second cell. The user equipment and the base station are configured to perform the method, thereof.

15 Claims, 5 Drawing Sheets

Related U.S. Application Data (60) Provisional application No. 63/021,819, filed on May 8, 2020.

(51) Int. Cl.
*H04W 12/06* (2021.01)
*H04W 12/60* (2021.01)
*H04W 48/16* (2009.01)
*H04W 84/04* (2009.01)

(56) References Cited

U.S. PATENT DOCUMENTS

| | | |
|---|---|---|
| 2011/0143712 A1 | 6/2011 | Christensson et al. |
| 2011/0235558 A1 | 9/2011 | Diachina et al. |
| 2013/0343319 A1 | 12/2013 | Quan et al. |
| 2016/0353371 A1 | 12/2016 | Zhang et al. |
| 2018/0160298 A1 | 6/2018 | Wang et al. |
| 2019/0124572 A1 | 4/2019 | Park et al. |
| 2019/0230499 A1 | 7/2019 | Sun et al. |
| 2020/0053602 A1 | 2/2020 | Kadiri et al. |
| 2020/0128585 A1 | 4/2020 | Kuang et al. |
| 2020/0229254 A1 | 7/2020 | Chang et al. |
| 2021/0359832 A1* | 11/2021 | Lei .................. H04W 72/1263 |
| 2022/0377530 A1 | 11/2022 | Mu |
| 2023/0075764 A1 | 3/2023 | Liu |

FOREIGN PATENT DOCUMENTS

| | | |
|---|---|---|
| EP | 3297334 A1 | 3/2018 |
| GB | 2510141 A | 7/2014 |
| WO | WO 2016/111919 A1 | 7/2016 |
| WO | 2017/074042 A1 | 5/2017 |
| WO | WO 2018/230983 A1 | 12/2018 |
| WO | WO 2019/062546 A1 | 4/2019 |
| WO | WO 2021/159492 A1 | 8/2021 |

OTHER PUBLICATIONS

"General Packet Radio Service (GPRS) enhancements for Evolved Universal Terrestrial Radio Access Network (E-UTRAN) access," 3GPP TS 23.401, Dec. 2012.
"Non-Access-Stratum (NAS) protocol for Evolved Packet System (EPS)," 3GPP TS 24.301, Dec. 2019.
"NR; Radio Resource Control (RRC) Protocol specification," 3GPP TS 38.331, Dec. 12, 2017.
"NR; Medium Access Control (MAC) protocol specification," 3GPP TS 38.321, Dec. 2017.
"Service requirements for cyber-physical control applications in vertical domains," 3GPP TS 22.104, Jul. 2020.
"Service requirements for the 5G system," 3GPP TS 22.261, Mar. 2017.
"Study on Communication for Automation in Vertical Domains," 3GPP TR 22.804, Jul. 2020.
"Study on enhancements for cyber-physical control applications in vertical domains," 3GPP TR 22.832, Sep. 2019.
"Study on Self evaluation towards I MT-2020 submission," 3 GPP TR 37.910, Sep. 2019.
Ericsson, "New SID on Support of Reduced Capability NR Devices," 3GPP TSG RAN Meeting #86, RP-193238, Dec. 9-12, 2019.
International Search Report and Written Opinion for Patent Cooperation Treaty Application No. PCT/EP2021/061825 dated Jul. 19, 2021, 15 pages.
Non-Final Office Action for U.S. Appl. No. 17/313,100 dated Aug. 2, 2022.
Notice of Allowance for U.S. Appl. No. 17/313,100 dated Aug. 30, 2023.
Notice of Allowance for U.S. Appl. No. 17/313,100 dated Aug. 9, 2023.
Notice of Allowance for U.S. Appl. No. 17/313,100 dated Jul. 11, 2023.
Office Action for European Application No. 21723969.8 dated May 2, 2023, 8 pages.
Office Action for European Application No. 21723969.8 dated Oct. 12, 2023, 7 pages.
Result of Consultation for European Application No. 21723969.8 dated Oct. 18, 2023, 3 pages.
Intention to Grant for European Application No. 21723969.8 dated May 3, 2024, 36 pages.
Extended European Search Report for European Application No. 25154150.4 dated Apr. 22, 2025, 11 pages.

* cited by examiner

METHOD OF PROVIDING ACCESS FOR REDUCED CAPABILITY DEVICES, USER EQUIPMENT, AND BASE STATION THEREOF

CROSS-REFERENCE TO RELATED APPLICATIONS

This application is a Continuation of U.S. application Ser. No. 17/313,100, filed May 6, 2021, and issued on Jan. 16, 2024 as U.S. Pat. No. 11,877,226, which claims priority under 35 U.S.C. § 119 to provisional application No. 63/021,819, filed on May 8, 2020, the entire contents of which are incorporated herein by reference.

BACKGROUND

Field

One or more example embodiments relate to wireless communications networks.

Related Art

Fifth generation (5G) wireless communications networks are a next generation of mobile communications networks. Standards for 5G communications networks are currently being developed by the Third Generation Partnership Project (3GPP). These standards are known as 3GPP New Radio (NR) standards.

SUMMARY

At least one example embodiment is directed toward a method for access in a communication network.

In one example embodiment, the method includes first receiving, by at least one processor of a user equipment (UE), authorization information, the authorization information including configuration data for reduced capability (REDCAP) devices in the communication network; second receiving, by the at least one processor, system information from at least one first base station serving a first cell, the system information including information specific to a device category associated with the UE; determining, by the at least one processor, access information for the first cell, based at least in part on the system information and the authorization information; and performing, by the at least one processor, one of the following based on the access information, accessing the first cell, or identifying a second cell.

In one example embodiment, the configuration data includes configuration of the communication network that allow access to network resources for REDCAP devices, where the network resources include at least one of a public land mobile network (PLMN), a radio access network, a frequency or a frequency range.

In one example embodiment, the system information identifies capabilities of the first cell for REDCAP devices.

In one example embodiment, the determining of the access information includes, determining whether the first cell is configured to allow access to the UE, based on an identified type of device that has been assigned to the UE.

In one example embodiment, the identified type of device for the UE includes information on a REDCAP functionality of the UE.

In one example embodiment, the identifying of the second cell includes, performing a search of the communication network to find the second cell, the second cell being configured to allow access of the UE, based on a REDCAP functionality of the UE, the second cell being served by at least one second base station, and accessing the second cell based on the access information.

In one example embodiment, the authorization information is received from a mobility management function, and the system information is received from the at least one first base station of the first cell.

In one example embodiment, the UE is a REDCAP device.

In one example embodiment, at least one second base station serves the second cell, and the at least one first base station and the at least one second base station include one of, a common base station that is common to both the at least one first base station and the at least one second base station, or unique base stations that do not include a base station that is common between the at least one first base station and the at least one second base station.

At least one example embodiment is directed toward a user equipment (UE) in a communication network.

In one example embodiment, the UE includes a memory containing computer-readable instructions; and at least one processor configured to read and execute the computer-readable instructions, in order to, first receive authorization information, the authorization information including configuration data for reduced capability (REDCAP) devices in the communication network, second receive system information from at least one first base station serving a first cell, the system information including information specific to a device category associated with the UE, determine access information for the first cell, based at least in part on the system information and the authorization information, and perform one of the following based on the access information, accessing the first cell, or identifying a second cell.

In one example embodiment, the configuration data includes configuration of the communication network that allow access to network resources for REDCAP devices, where the network resources include at least one of a public land mobile network (PLMN), a radio access network, a frequency or a frequency range.

In one example embodiment, the at least one processor is configured to determine the access information by: determining whether the first cell is configured to allow access by the UE, based on an identified type of device that has been assigned to the UE.

In one example embodiment, the at least one processor is configured to identify the second cell by: performing a search of the communication network to find the second cell, the second cell being configured to allow access by the UE, based on a REDCAP functionality of the UE, the second cell being served by at least one second base station, and accessing the second cell based on the access information.

In one example embodiment, the UE is a REDCAP device.

At least one example embodiment is directed toward a method for access in a communication network.

In one example embodiment, the method comprises first transmitting, by at least one processor of at least one first base station serving a first cell, authorization information to a user equipment (UE), the authorization information including configuration data for reduced capability (REDCAP) devices in the communication network; second transmitting, by the at least one processor, system information to the UE, the system information including information specific to a device category associated with the UE; performing, by the at least one processor, one of the following based on the authorization information and the system information, establishing a connection with the UE, or sending a notification to the UE commanding the UE to identify a second cell.

In one example embodiment, the performing further includes: establishing the connection with the UE, the UE being a REDCAP device.

In one example embodiment, the performing further includes: sending the notification, the notification indicating that the first cell is not configured to provide resources for the device category that is associated with the UE.

At least one example embodiment is directed toward at least one first base station serving a first cell in a communication network.

In one example embodiment, the at least one first base station includes a memory containing computer-readable instructions; and at least one processor configured to read and execute the computer-readable instructions, in order to, first transmit authorization information to a user equipment (UE), the authorization information including configuration data for reduced capability (REDCAP) devices in the communication network, second transmit system information to the UE, the system information including information specific to a device category associated with the UE, perform one of the following based on the authorization information and the system information, establish a connection with the UE, or send a notification to the UE commanding the UE to identify a second cell of a second base station.

In one example embodiment, the at least one processor is further configured to: establish the connection with the UE, wherein the UE is a REDCAP device.

In one example embodiment, the notification indicates that the first cell is not configured to provide resources for the device category that is associated with the UE.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of radio network elements (e.g., gNB), user equipment, or the like, it should be understood that one or more example embodiments discussed herein may be performed by the one or more processors (or processing circuitry) at the applicable device. For example, according to one or more example embodiments, at least one memory may include or store computer program code, and the at least one memory and the computer program code may be configured to, with at least one processor, cause a radio network element (or user equipment) to perform the operations discussed herein.

It will be appreciated that a number of example embodiments may be used in combination.

Figure 1:
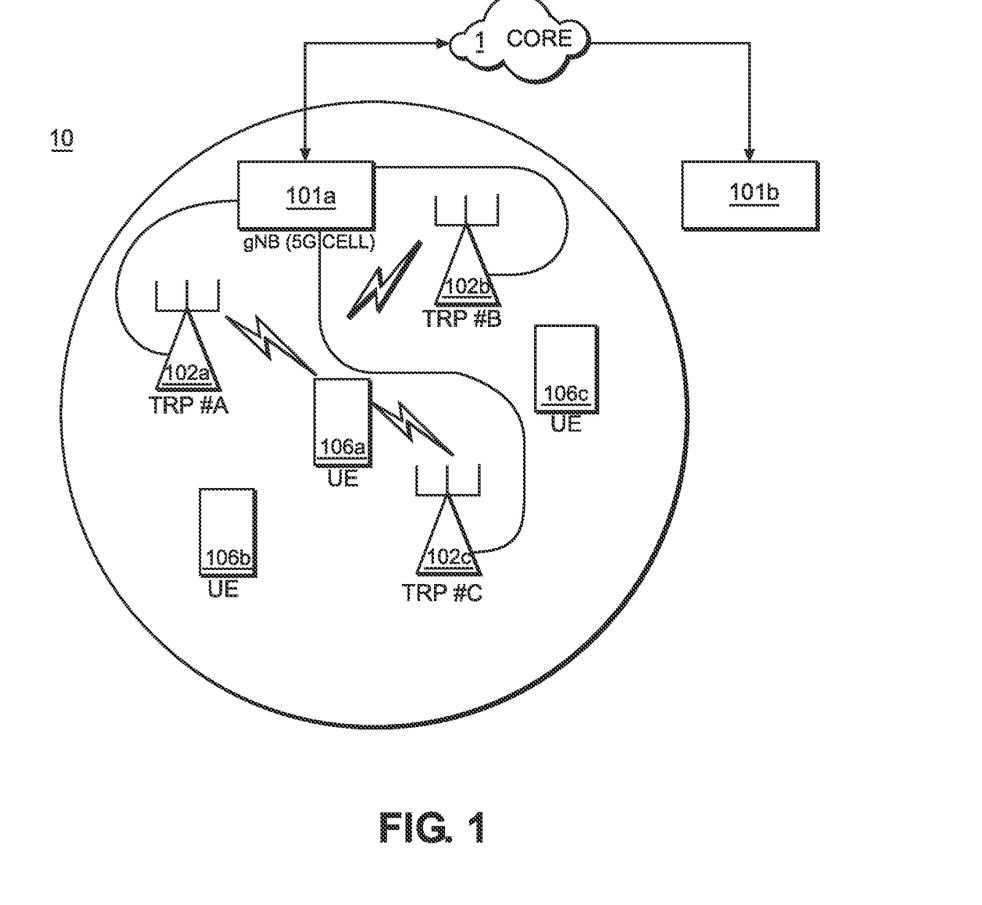
FIG. 1 illustrates a simplified diagram of a portion of a $3^{rd}$ Generation Partnership Project (3GPP) New Radio (NR) access deployment for explaining example embodiments.

FIG. 1 illustrates a simplified diagram of a portion of a $3^{rd}$ Generation Partnership Project (3GPP) New Radio (NR) access network 10 for explaining example embodiments. The 3GPP NR radio access deployment includes at least a first base station (e.g., gNB 101a) having transmission and reception points (TRPs) 102a, 102b, 102c. Each TRP 102a, 102b, 102c may be, for example, a remote radio head (RRH) or remote radio unit (RRU) including at least, for example, a radio frequency (RF) antenna (or antennas) or antenna panels, and a radio transceiver, for transmitting and receiving data within a geographical area. In an example embodiment, the TRP 102a, 102b, 102c can be considered secondary base stations that serve secondary cells (SCells), from the standpoint the TRP 102a, 102b, 102c are smaller base stations that communicate in conjunction with a larger base station (e.g., gNB 101a) that serves a larger cell. The TRPs 102a, 102b, 102c provide cellular resources for user equipment (UEs) 106a, 106b, 106c within a geographical coverage area. In some cases, baseband processing may be divided between the TRPs 102a, 102b, 102c and gNB 101a in a 5th Generation (5G) cell. Alternatively, the baseband processing may be performed at the gNB 101a. In the example shown in FIG. 1, the TRPs 102a, 102b, 102c are configured to communicate with the UEs (e.g., UE 106a) via one or more transmit (TX)/receive (RX) beam pairs. The gNB 101a communicates with the network core 1, which is referred to as the New Core in 3GPP NR. In an example embodiment, at least a second base station (e.g., gNB 101b), in a different cell (serving area), can also be included in the network 10.

The TRPs 102a, 102b, 102c may have independent schedulers, or the gNB 101a may perform joint scheduling among the TRPs 102a, 102b, 102c.

It should be understood that the gNB 101a and TRPs 102a, 102b, 102c can provide communication services to a relatively large number of UEs 106a, 106b, 106c within the coverage area of the TRPs 102a, 102b, 102c. For the sake of clarity of example embodiments, communication services (including transmitting and receiving wireless signals) will be discussed primarily between the gNB 101a, TRP 102a and/or the UE 106a, though it should be understood that signals may be transmitted between the gNB 102, any of the TRPs 102a, 102b, 102c, and any of the UEs 106a, 106b, 106c.

Figure 2:
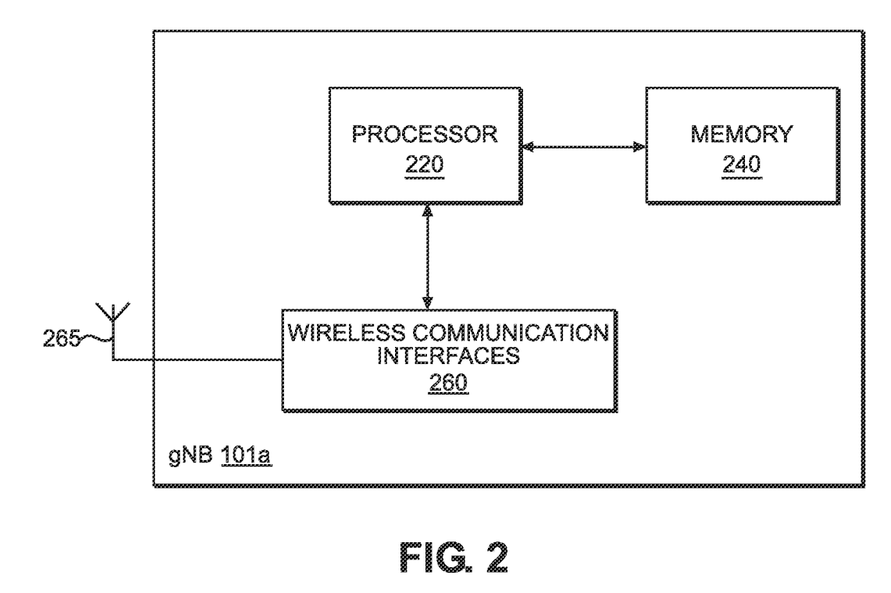
FIG. 2 illustrates a block diagram of a gNB, in accordance with an example embodiment.

FIG. 2 illustrates a block diagram of a gNB 101a (shown in FIG. 1), in accordance with an example embodiment. As shown, the gNB 101a includes: a memory 240; a processor 220 connected to the memory 240; various interfaces 260 connected to the processor 220; and one or more antennas or antenna panels 265 connected to the various interfaces 260. The various interfaces 260 and the antenna 265 may constitute a transceiver for transmitting/receiving data from/to the gNB 101a via a plurality of wireless beams or from/to the plurality of TRPs 102a, 102b, 102c, etc. As will be appreciated, depending on the implementation of the gNB 101a, the gNB 101a may include many more components than those shown in FIG. 2. However, it is not necessary that all of these components be shown in order to disclose the illustrative example embodiment.

The memory 240 may be a computer readable storage medium that generally includes a random access memory (RAM), read only memory (ROM), and/or a permanent mass storage device, such as a disk drive. The memory 240 also stores an operating system and any other routines/modules/applications for providing the functionalities of the gNB 101a (e.g., functionalities of a gNB, methods according to the example embodiments, etc.) to be executed by the processor 220. These software components may also be loaded from a separate computer readable storage medium into the memory 240 using a drive mechanism (not shown). Such separate computer readable storage medium may include a disc, tape, DVD/CD-ROM drive, memory card, or other like computer readable storage medium (not shown). In some example embodiments, software components may be loaded into the memory 240 via one of the various interfaces 260, rather than via a computer readable storage medium.

The processor 220 may be configured to carry out instructions of a computer program by performing the arithmetical, logical, and input/output operations of the system. Instructions may be provided to the processor 220 by the memory 240.

The various interfaces 260 may include components that interface the processor 220 with the antenna 265, or other input/output components. As will be understood, the various interfaces 260 and programs stored in the memory 240 to set forth the special purpose functionalities of the gNB 101a will vary depending on the implementation of the gNB 101a.

The interfaces 260 may also include one or more user input devices (e.g., a keyboard, a keypad, a mouse, or the like) and user output devices (e.g., a display, a speaker, or the like).

Although not specifically discussed herein, the configuration shown in FIG. 2 may be utilized to implement, inter alia, the TRPs 102a, 102b, 102c, other radio access and backhaul network elements and/or devices. In this regard, for example, the memory 240 may store an operating system and any other routines/modules/applications for providing the functionalities of the TRPs, etc. (e.g., functionalities of these elements, methods according to the example embodiments, etc.) to be executed by the processor 220.

In an example embodiment, the second base station 101b, and additional base stations in the network 10, have the same structure that is depicted in FIG. 2 for the first base station 101a.

Figure 3:
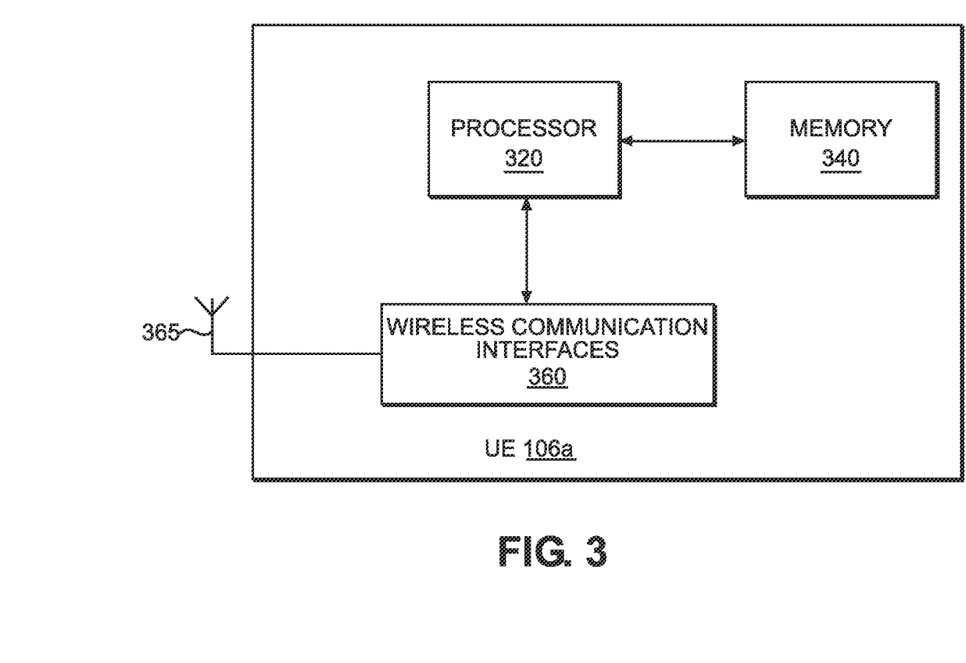
FIG. 3 illustrates a block diagram of a user equipment (UE), in accordance with an example embodiment.

FIG. 3 illustrates a block diagram of the user equipment (UE) 106a, in accordance with an example embodiment. It should be understood that the other UEs 106b, 106c have the same structure. The UE 106a is a device used by an end-user to communicate via the 3GPP NR radio access deployment shown in FIG. 1. Examples of UEs include cellular phones, smartphones, tablet, computers, laptop computers, or the like.

As shown, the UE 106a includes: a memory 340; a processor 320 connected to the memory 340; various interfaces 360 connected to the processor 320; and one or more antennas or antenna panels 365 connected to the various interfaces 360. The various interfaces 360 and the antenna 365 may constitute a transceiver for transmitting/receiving data to/from the gNB 101a via a plurality of wireless beams or to/from the plurality of TRPs 102a, 102b, 102c, etc. As will be appreciated, depending on the implementation of the UE 106a, the UE 106a may include many more components than those shown in FIG. 3. However, it is not necessary that all of these generally conventional components be shown in order to disclose the illustrative example embodiment.

The memory 340 may be a computer readable storage medium that generally includes a random access memory (RAM), read only memory (ROM), and/or a permanent mass storage device, such as a disk drive. The memory 340 also stores an operating system and any other routines/modules/applications for providing the functionalities of the UE 106a (e.g., functionalities of a UE, methods according to the example embodiments, etc.) to be executed by the processor 320. These software components may also be loaded from a separate computer readable storage medium into the memory 340 using a drive mechanism (not shown). Such separate computer readable storage medium may include a disc, tape, DVD/CD-ROM drive, memory card, or other like computer readable storage medium (not shown). In some example embodiments, software components may be loaded into the memory 340 via one of the various interfaces 360, rather than via a computer readable storage medium.

The processor 320 may be configured to carry out instructions of a computer program by performing the arithmetical, logical, and input/output operations of the system. Instructions may be provided to the processor 320 by the memory 340.

The various interfaces 360 may include components that interface the processor 320 with the antenna 365, or other input/output components. As will be understood, the various interfaces 360 and programs stored in the memory 340 to set forth the special purpose functionalities of the UE 106a will vary depending on the implementation of the UE 106a.

The interfaces 360 may also include one or more user input devices (e.g., a keyboard, a keypad, a mouse, or the like) and user output devices (e.g., a display, a speaker, or the like).

General Concepts

In an example embodiment, usage scenarios identified for 5G are "enhanced mobile broadband" (eMBB), "massive machine-type communication" (mMTC), and "Ultra-Reliable and Low Latency communication" (URLLC). In an example embodiment, another identified area, to locate the boundary between mMTC and URLLC, is "time sensitive communication" (TSC). In an example embodiment, mMTC, URLLC and TSC are associated with novel internet-of-things (IoT) use cases that are targeted, for instance, in vertical industries. In an example embodiment, eMBB, mMTC, URLLC and TSC use cases need to be supported in a same network, such as the network 10 described below (see FIG. 1). In an example embodiment, narrowband internet-of-things (NB-IoT) and long-term evolution machine communication (LTE-M) fulfill a requirement for mMTC and can be certified for use in 5G technologies. In an example embodiment, for ultra-reliable low-latency communication (URLLC) support, URLLC features have been introduced for both LTE and new radio (NR), and NR URLLC is further enhanced within enhanced URLLC (eU-RLLC) and industrial IoT work items. Support for time-sensitive networking (TSN) and 5G integration for TSC use cases have also been introduced.

In an example embodiment, 5G is enabled to connect industries. In an example embodiment, 5G connectivity serves as a catalyst for a next wave of industrial transformation and digitalization, which improves flexibility, enhancing productivity and efficiency, reducing maintenance costs, and improving operational safety. In an example embodiment, devices in such environment include, for example, pressure sensors, humidity sensors, thermometers, motion sensors, accelerometers, actuators, etc. In an example embodiment, connecting these sensors and actuators to 5G networks and a core network can be beneficial. A massive industrial wireless sensor network (IWSN) uses requirements described in at least 3GPP specification TR 22.804, TS 22.104, TR 22.832 and TS 22.261, which include URLLC services with very high requirements, and also relatively low-end services with the requirements for small devices or completely wireless devices with a battery life lasting several years. The 3GPP requirements for these services are higher than low-power wide-area LPWA devices, such as LTE-M/NB-IOT, but the requirements are lower than ultra-reliable and low latency (URLCC) devices and eMBB devices.

In an example embodiment, and similar to connected industries, 5G connectivity can serve as a catalyst for a next wave of smart city innovations. For example, the 3GPP specification TS 22.804 describes "smart city" requirements. In an example embodiment, the smart city vertically covers data collection and processing, in order to more efficiently monitor and control city resources, and provide services to city residents. In an example embodiment, a deployment of surveillance cameras is an essential part of the smart city, which may also be implemented for factories and industries.

In an example embodiment, wearable devices, such as smart watches, rings, eHealth related devices, and medical monitoring devices can benefit from low-end service requirements for small devices. In an example embodiment, a characteristic for these service requirements is that the device is relatively "small in size."

In an example embodiment, the requirements for these "small in size" devices is listed, below.

Device complexity: In an example embodiment, a motivation for the small device is a lower cost device, with a lower complexity, as compared to high-end eMBB and URLLC devices (which are defined, for instance, in Rel-15/Rel-16 of 3GPP). In an example embodiment, this is especially the case for small devices that are industrial sensors.

Device size: In an example embodiment, a requirement for most the small devices is that the devices are enabled as a physically small device, from a form factor standpoint. In an example embodiment, and as described above, the small devices are for instance wearables, small sensors, small monitors, etc.

Deployment scenarios: In an example embodiment, a system should support all frequency-1 (FR1)/frequency-2 (FR2) bands, for frequency division duplex (FDD) and time division duplex (TDD) networks.

In an example embodiment, use case specific requirements are listed below:

Industrial wireless sensors: In an example embodiment, requirements for sensors is described in 3GPP TR 22.832 and TS 22.104. In an example embodiment, sensors have a communication service availability of 99.99% and an end-to-end latency of less than 100 ms. In an example embodiment, a reference bit rate of the sensors is less than 2 Mbps for all devices that are stationary, where the bit rate is potentially asymmetric (e.g. UL heavy traffic). In an example embodiment, a battery for the sensor should last at least a few years. In an example embodiment, for safety related sensors, a latency requirement is relatively low, such as 5-10 ms.

Video Surveillance: In an example embodiment, and as described in 3GPP TS 22.804, a reference economic video bitrate for video surveillance devices is 2-4 Mbps, a latency is less than 500 ms, a reliability (availability) is 99%-99.9%. In an example embodiment, high-end video is used with the video surveillance, for example the video transmission rate is 7.5-25 Mbps. In an example embodiment, a traffic pattern for the video surveillance is dominated by uplink (UL) transmissions.

Wearables: In an example embodiment, a reference bitrate for smart wearable application can be 10-50 Mbps, in a downlink (DL) direction, with a minimum 5 Mbps in UL, and with a peak bit rate of 150 Mbps for downlink and 50 Mbps for uplink In an example embodiment, a battery for the device lasts multiple days (up to 1-2 weeks).

Example embodiments are applicable to user equipment (UE) features and parameters with lower end capabilities, relative to 3GPP Release 16 for eMBB and URLLC NR, to serve the three use cases described above.

Example embodiments apply to the following devices:

In an example embodiment, the devices that have reduced capabilities may include a limited set of one or more device types to ensure that the device types may be used for their intended use.

In an example embodiment, a functionality for the reduced capability devices is to be explicitly identifiable to networks and network operators, to allow network operators to restrict the access of the devices, if desired.

Problem to be Solved

"Reduced capability" (REDCAP) devices, such as for example REDCAP UEs, may consume more network resources compared to traditional devices, and therefore the network needs the capability to allow the network, or the network operators, to control access of the REDCAP devices.

Restriction on Use of Enhanced Coverage

In an example embodiment, to manage use of potentially extensive resources from the network for REDCAP devices, a network operator may prevent specific subscribers from using enhanced coverage, for example. In an example embodiment, when in narrow-band (NB) S1 mode, the UE shall indicate support for restriction on use of enhanced coverage. In an example embodiment, when in wide-band (WB) S1 mode, the UE supporting either Coverage Extention (CE) mode A or CE mode B shall indicate support for restriction on use of enhanced coverage. In an example embodiment, the UE supporting restriction on use of enhanced coverage indicates its support for restriction on use of enhanced coverage in an "attach request" and a "tracking area update request" message. In an example embodiment, if the UE supports restriction on use of enhanced coverage, the mobility management entity (MME) indicates whether the use of enhanced coverage is restricted or not in an "attach accept" message and a "tracking area update accept" message. In an example embodiment, if the use of enhanced coverage is restricted, the UE shall not use enhanced coverage in a registered public land mobile network (PLMN), and in any PLMN which is in a list of equivalent PLMNs.

In an example embodiment, if the REDCAP UE supports CE mode B, the network determines the following:

the use of enhanced coverage is not restricted for the UE; or

CE mode B is not restricted for the UE;

In an example embodiment, with regards to this determination, an applicable non-access-stratum (NAS) timer value is calculated by the network, where the NAS timer is described in sub-clause 4.8 of 3GPP TS 36.304, which is incorporated by reference in its entirety.

In an example embodiment, if the REDCAP UE supports CE mode B, and upper layers of the network indicate that CE mode B is restricted, then the cell selection criterion (S) in a normal coverage is based on values Qrxlevmin and Qqualmin, or in enhanced coverage the cell selection criterion is based on values Qrxlevmin_CE and Qqualmin_CE that are to be fulfilled.

In an example embodiment, if cell selection criterion S in normal coverage is not fulfilled for a cell, and the REDCAP UE does not consider itself in enhanced coverage based on coverage specific values Qrxlevmin_CE and Qqualmin_CE, the UE shall consider itself to be in enhanced coverage, if the UE supports CE Mode B and CE mode B is not restricted by upper layers, and the cell selection criterion S for enhanced coverage is fulfilled, where:

Qrxlevmin UE applies coverage specific value Qrxlevmin_CE1 (dBm)

Qqualmin UE applies coverage specific value Qqualmin_CE1 (dB)

Example Communication Scheme, According to Some Example Embodiments

The example embodiments include restricting access of REDCAP UEs. More specifically, in an example embodiment the restriction/allowance of access can be limited to certain REDCAP UEs, for instance, pertaining to a used feature and/or a subscription type.

Figure 4:
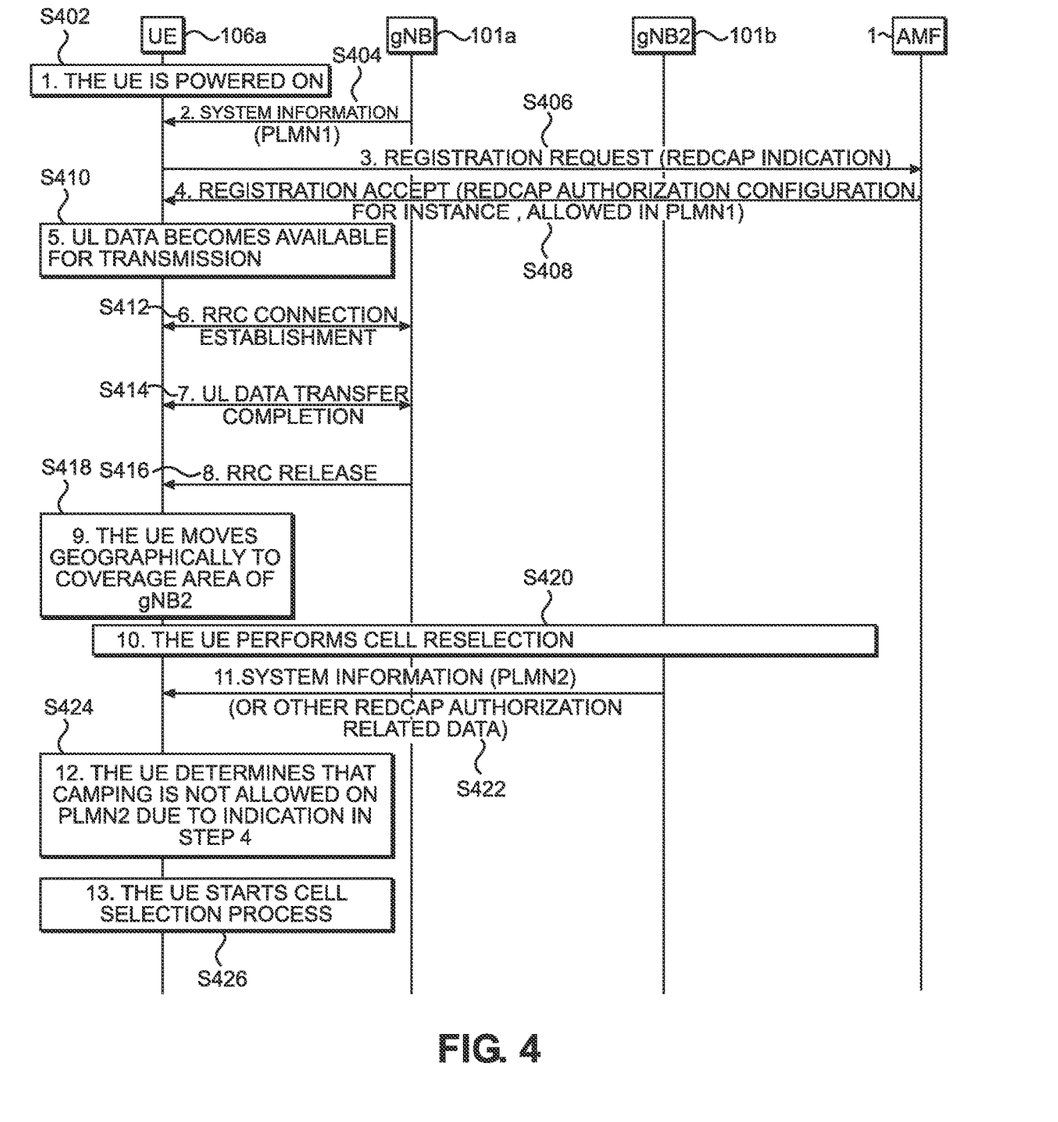
FIG. 4 illustrates a communication diagram for providing access for reduced capability devices, in accordance with an example embodiment.

FIG. 4 illustrates a communication diagram for providing access for reduced capability devices, in accordance with an example embodiment. In an example embodiment, the UE 106a of FIG. 1 is a REDCAP device that has reduced capabilities, as defined above. In an example embodiment, while the discussion of FIG. 4 includes UE 106a, it should be understood that any other REDCAP device, in addition to another UE device, or any other REDCAP device as discussed herein, can instead be included in this FIG. 4 example embodiment.

In an example embodiment, and as shown in step S402 of FIG. 4, the UE 106a is turned on.

In an example embodiment, and as shown in step S404, the processor 220 of the first base station (e.g., gNB 101a of FIG. 1) sends system information for the network 10. In an example embodiment, the system information is sent within a first registered public land mobile network (PLMN1), which is associated with a coverage area of the gNB 101a.

In an example embodiment, and as shown in step S406, the processor 320 of the UE 106a sends a registration request message (REDCAP indication) to a mobility management function (AMF) that is located within the network core 1.

In an example embodiment, and as shown in step S408, the processor 320 of the UE 106a receives a registration accept message from the AMF, in response to the registration request message. In an example embodiment, the registration accept message includes information that includes a REDCAP authorization configuration for the UE 106a.

With regard steps S404, S406 and S408 of FIG. 4, a further discussion of a content of the information exchange for these steps, is included below.

Establishing Access—Information Exchange of steps S404, S406 and S408:

In an example embodiment, the REDCAP UE 106a is informed, for example via radio resource control (RRC) or NAS signaling, whether REDCAP functionality is allowed in the network, or not.

In an example embodiment, allowance information is signaled, based on the PLMN, the radio access network (RAT), the frequency, and/or the frequency range. In one example embodiment, allowance information may comprise multiple of the PLMNs, the RATs, the frequencies, and/or the frequency ranges, and/or a combination of these.

In an example embodiment, allowance information for REDCAP functionality is signaled explicitly for different features (i.e. usage of some feature can be allowed, and usage of some feature can be disallowed, etc.). In an example embodiment, the processor 320 of the UE 106a may deduce, for example from broadcasted system information, whether the UE 106a is allowed to access the serving cell of the gNB 101a, based on the allowed functionality.

In an example embodiment, allowance information is signaled, for example for one or more of the following functionalities: reduced number of UE 106a receive (RX)/transmit (TX) antennas, radio resource management (RRM) relaxation, coverage enhancement, half-duplex-FDD, device type (e.g., REDCAP type-1, REDCAP type-2), etc.

In an example embodiment, the UE 106a is assigned a REDCAP device category. In an example embodiment, notification of this assignment occurs, for example, via RRC or NAS signaling, or encoded in a universal subscriber identity module (USIM), where the processor 320 of the UE 106a checks the access restriction/allowance for a specific cell (such as the cell served by the gNB 101a that the UE 106a is currently in). In an example embodiment, the core 1 of the network 10, or the AMF of the core 1, can indicate to the UE 106a (for example via the system information), the identity of the device categories that are allowed and restricted in the cell.

REDCAP Device is Available for Transmission

Continuing with the discussion of FIG. 4, in an example embodiment and as shown in step S410, the processor 320 of the UE 106a determines that uplink data in the memory 340 of the UE 106a is available for transmission.

In an example embodiment, and as shown in step S412, the processor 320 of the UE 106a and the processor 220 of the gNB 101a establish a RRC connection.

In an example embodiment, and as shown in step S414, the processor 320 of the UE 106a and the processor 220 of the gNB 101a conduct an uplink data transmission exchange.

In an example embodiment, and as shown in step S416, the processor 320 of the UE 106a receives a RRC release message from the processor 220 of the gNB 101a.

REDCAP Device Moves

Continuing with the discussion of FIG. 4, in an example embodiment and as shown in step S418, UE 106a moves to another geographic location (e.g., PLMN2), and the processor 320 of the UE 106a determines that the UE 106a is now in another cell area, such as for instance a cell of the second base station (e.g., gNB 101b of network 10 of FIG. 1).

In an example embodiment, and as shown in step S420, the processor 320 of the UE 106a performs cell selection, to select the new cell area associated with gNB 101b.

In an example embodiment, and as shown in step S422, the processor 320 of the UE 106a receives system information from the gNB 101b. In an example embodiment, this step is the same as step S404, described above.

In an example embodiment, and as shown in step S424, the processor 320 of the UE 106a determines that "camping" of the UE 106a is not allowed in the new cell area (PLMN2), due to the indication information that was originally obtained in step S408 from the AMF of the core 1.

In an example embodiment, and as shown in step S426, the processor 320 of the UE 106a determines that a new cell selection process should be conducted. Therefore, in an example embodiment, the processor 320 of the UE 106a starts the selection process for a new cell that allows access for the UE 106a (e.g., a new cell that allows access of a REDCAP device).

Added Implementations of the Communication Scheme, According to Some Example Embodiments In an example embodiment, and alternatively to the step S408 of FIG. 4, the Registration Accept (step S408 in FIG. 4) could provide the processor 320 of the UE 106a with indication information that includes of an identity of carriers (under a PLMN(s)) that can be used by REDCAP UEs (e.g. for camping). In an example embodiment, the network 10, or the core 1 of the network 10, can indicate to the REDCAP UE 106a that only a first frequency carrier (e.g., FR1 carrier) is allowed, while a second frequency carrier (e.g., FR2 carrier) does not allow access for the UE 106a. In an example embodiment, the indication from the network 10 informs the UE 106a, for instance, whether TDD carriers allow access of the UE 106a, or whether only FDD carriers allow access of the UE 106a for high-density (HD) operations (as an example).

In an example embodiment, the network 10, or the core 1 of the network 10, determines the PLMN, RAT, carrier frequencies or frequency ranges, based on the UE 106a capability, for example so that if the REDCAP UE 106a bandwidth capability requires, for instance, maximum bandwidth (max BW) or radio frequency (RF) front-end requirements, these requirements are met. In an example embodiment, if the network 10 cannot meet the requirements for the UE 106a, the network 10 or the core 1, access for the UE 106a will be restricted for certain carrier frequencies, for example, where the total carrier bandwidth is not large enough. In an example embodiment, if the REDCAP UE 106a is for example only half-duplex capable, only TDD carriers are indicated to be allowed. Consequently, if the UE 106a has limitations for the HD capability (as an example), in terms of continuous UL or DL allocations, the network 10 and/or core 1 can indicate only selected TDD carriers which UL-DL-TDD configuration would be best match for the capability, or whether FDD carriers are to be used, and minimize the network implications. In one example embodiment, the REDCAP UE 106a is authorized to use only certain maximum channel bandwidth or bandwidth part width. In case such is not available on a cell, the REDCAP UE 106a may not be allowed to access the cell.

Example Method at a Device, According to Some Example Embodiments

Figure 5:
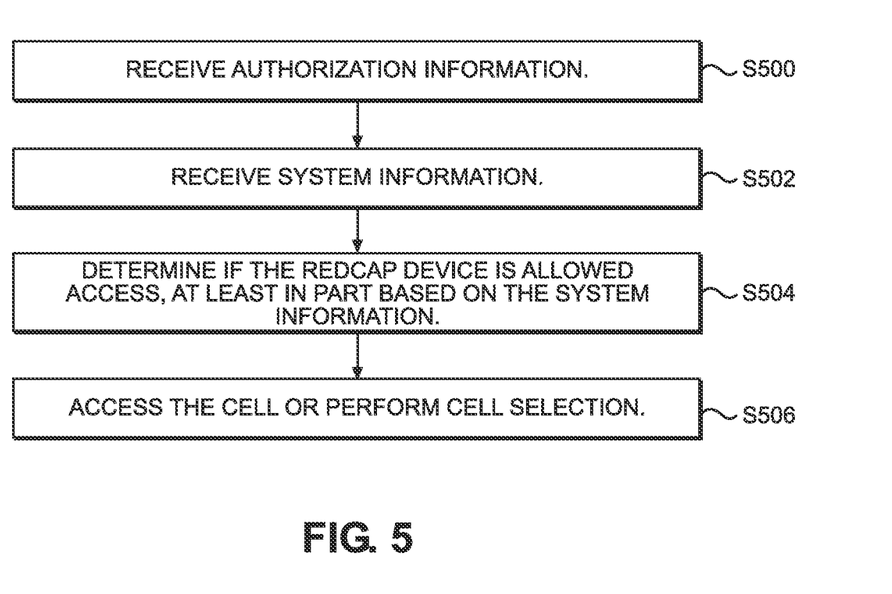
FIG. 5 illustrates a method for providing access for reduced capability devices, in accordance with an example embodiment.

FIG. 5 illustrates a method for providing access for reduced capability devices, in accordance with an example embodiment. In an example embodiment, the method is performed by a REDCAP device. In an example embodiment, the method is performed by the processor 320 of the REDCAP UE 106a, as shown in FIGS. 1 and 3.

In an embodiment, and as shown in step S500, the processor 320 of the UE 106a receives authorization information. In an example embodiment, the authorization information is received from the core 1 of the network 10. In an example embodiment, the authorization information is received directly via the core 1, or the AMF of the core 1, or from a base station (e.g., gNB 101a) that provides cell coverage within the area of the UE 106a. In an example embodiment, the authorization information includes configuration information (configuration data). In an example embodiment, the authorization information includes REDCAP authorization configuration information, that includes REDCAP access information. In an example embodiment, the configuration information includes access information for the UE 106a for at least one of: a PLMN, a RAT, a frequency, or a frequency range. In an example embodiment, the authorization information includes permissions to allow REDCAP access for the UE 106a, for the UE 106a to operate with at least one capability that is reduced, in terms of: a reduced number of RX/TX antennas, a RRM relaxation, coverage enhancement, and/or half-duplex FDD. In an example embodiment, the authorization information and//or the configuration information includes an identity of the device type for the UE 106a (e.g., REDCAP device type). In an example embodiment, this step S500 is the same as step S408 of FIG. 4

In an embodiment, and as shown in step S502, the processor 320 of the UE 106a receives system information. In an example embodiment, the system information is received from the core 1 of the network 10. In an example embodiment, the system information is received from a base station (e.g., gNB 101a) that provides cell coverage within the area of the UE 106a (e.g., the area where the UE 106a is "camping"). In an example embodiment, the system information is specific to the first base station (e.g., gNB 101a). In an example embodiment, this step S502 is the same as step S404 described in FIG. 4.

In an example embodiment, and as shown in step S504, the processor 320 of the UE 106a determines access information, at least in part due to the system information from step S502. In an example embodiment, the processor 320 of the UE 106a determines access information, at least in part due to the system information and the authorization information (of step S500). In an example embodiment, the determination of the access information includes a determination of whether the UE 106a is allowed to access the cell of the gNB 101. In an example embodiment, this step is the same as step S424 of FIG. 4.

In an example embodiment, and as shown in step S506, the processor 320 of the UE 106a accesses the cell (first cell), or performs a selection of another cell (a second cell) that does allow REDCAP access, based on the determination of step S504. In an example embodiment, the step of accessing of the first cell is the same as steps S410-S416 of FIG. 4. In an example embodiment, the selection of the second cell is the same as step S426 of FIG. 4.

In an example embodiment, the first cell is served by at least one first base station that includes the first base station (101a), as shown in FIG. 1. In an example embodiment, the second cell is served by at least one second base station that includes the second base station (101b), as shown in FIG. 1. In an example embodiment, the first cell and the second cell each include multiple base stations that serve each of the cells. In an example embodiment, the first cell and the second cell include at least one common base station that is common to both cells. In an example embodiment, the first cell and the second cell do not share any common base stations.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing user equipment, base stations, an as Evolved Node B (eNBs), a remote radio head (RRH), a 5G base station (gNBs), femto base stations, network controllers, computers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, user equipment, base stations, eNBs, RRHs, gNBs, femto base stations, network controllers, computers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner Benefits, other advantages, and solutions to problems have been described above with regard to specific embodiments of the present disclosure. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A method for a reduced capability (REDCAP) device, the method comprising:
receiving system information from a base station serving a cell, the system information including allowance information specific to a device category associated with the REDCAP device;
receiving authorization information including configuration data for REDCAP devices and indicating whether a half-duplex frequency division duplex functionality is allowed for the REDCAP device; and
determining, by the REDCAP device based on the allowance information and the authorization information, whether access to the cell by the REDCAP device is permitted.

2. The method of claim 1, further comprising:
accessing the cell in a case that the determining determines that access to the cell by the REDCAP device is permitted, or
selecting a different cell in a case that the determining determines that access to the cell by the REDCAP device is not permitted.

3. The method of claim 1, wherein the system information identifies capabilities of the cell for REDCAP devices.

4. The method of claim 1, wherein the determining further comprises determining, based on a number of antennas of the REDCAP device, whether access to the cell by the REDCAP device is permitted.

5. The method of claim 1, further comprising receiving information indicating at least one frequency on which access is permitted for the REDCAP device.

6. The method of claim 1, wherein the REDCAP device includes at least one of: a sensor; a video surveillance device; a wearable device; a user equipment; a cellular telephone; a smartphone; a tablet device; a computer; or a laptop computer.

7. The method of claim 1, wherein the allowance information indicates whether REDCAP functionality is allowed in the cell.

8. The method of claim 1, wherein the authorization information includes permissions to allow REDCAP access for the REDCAP device to operate with a reduced number of antennas.

9. A reduced capability (REDCAP) device comprising:
a memory containing computer-readable instructions; and
at least one processor configured to execute the computer-readable instructions to cause the REDCAP device to:
receive system information from a base station serving a cell, the system information including allowance information specific to a device category associated with the REDCAP device;
receive authorization information including configuration data for REDCAP devices and indicating whether a half-duplex frequency division duplex functionality is allowed for the REDCAP device; and
determine, based on the allowance information and the authorization information, whether access to the cell by the REDCAP device is permitted.

10. The REDCAP device of claim 9, wherein the at least one processor is configured to execute the computer-readable instructions to cause the REDCAP device to
access the cell in a case that the determining determines that access to the cell by the REDCAP device is permitted.

11. The REDCAP device of claim 9, wherein the at least one processor is configured to execute the computer-readable instructions to cause the REDCAP device to
select a different cell in a case that the determining determines that access to the cell by the REDCAP device is not permitted.

12. The REDCAP device of claim 9, wherein the at least one processor is configured to execute the computer-readable instructions to cause the REDCAP device to determine, based on a number of antennas of the REDCAP device, whether access to the cell by the REDCAP device is permitted.

13. The REDCAP device of claim 9, wherein the at least one processor is configured to execute the computer-readable instructions to cause the REDCAP device to receive information indicating at least one frequency on which access is permitted for the REDCAP device.

14. The REDCAP device of claim 9, including at least one of: a sensor; a video surveillance device; a wearable device; a user equipment; a cellular telephone; a smartphone; a tablet device; a computer; or a laptop computer.

15. The REDCAP device of claim 9, wherein the authorization information includes permissions to allow REDCAP access for the REDCAP device to operate with a reduced number of antennas.

\* \* \* \* \*